(12) United States Patent
Brelin

(10) Patent No.: US 7,003,604 B2
(45) Date of Patent: Feb. 21, 2006

(54) METHOD OF AND APPARATUS FOR CANCELLING A PENDING AV/C NOTIFY COMMAND

(75) Inventor: Jon Ebbe Brelin, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 420 days.

(21) Appl. No.: 09/971,998

(22) Filed: Oct. 4, 2001

(65) Prior Publication Data

US 2003/0070015 A1   Apr. 10, 2003

(51) Int. Cl.
G06F 13/00 (2006.01)

(52) U.S. Cl. .................................. 710/105; 340/825.57

(58) Field of Classification Search ................ 710/100, 710/105; 709/230; 370/912, 546; 340/825.37
See application file for complete search history.

(56) References Cited

U.S. PATENT DOCUMENTS

| | | | |
|---|---|---|---|
| 4,780,821 A | 10/1988 | Crossley .................... | 364/200 |
| 4,922,486 A | 5/1990 | Lidinsky et al. ............. | 370/60 |
| 5,020,054 A | 5/1991 | May, Jr. ..................... | 370/94 |
| 5,077,732 A | 12/1991 | Fischer et al. ............. | 370/85.4 |
| 5,117,070 A | 5/1992 | Ueno et al. ................. | 178/2 R |
| 5,367,679 A | 11/1994 | Khaira ...................... | 395/650 |
| 5,394,522 A | 2/1995 | Sanchez-Frank et al. ... | 395/159 |
| 5,422,883 A | 6/1995 | Hauris et al. ................ | 370/62 |
| 5,436,898 A | 7/1995 | Bowen et al. ................ | 370/79 |
| 5,446,733 A | 8/1995 | Tsuruoka .................... | 370/60.1 |
| 5,471,474 A | 11/1995 | Grobicki et al. ........... | 370/85.2 |
| 5,479,385 A | 12/1995 | Hoekstra .................... | 369/24 |
| 5,495,481 A | 2/1996 | Duckwall .................. | 370/85.2 |
| 5,499,018 A | 3/1996 | Welmer ................ | 340/825.07 |
| 5,500,934 A | 3/1996 | Austin et al. ............... | 395/755 |
| 5,524,213 A | 6/1996 | Dais et al. ............. | 395/200.17 |
| 5,528,513 A | 6/1996 | Vaitzblit et al. ......... | 364/514 A |
| 5,548,722 A | 8/1996 | Jalalian et al. ........... | 395/200.1 |
| 5,555,413 A | 9/1996 | Lohman et al. ............. | 395/733 |
| 5,557,724 A | 9/1996 | Sampat et al. .............. | 395/157 |

(Continued)

FOREIGN PATENT DOCUMENTS

EP   0 577 054 A1   1/1994

(Continued)

OTHER PUBLICATIONS

Mitsuhiro Miyashita et al. "Real-time DV Transmission on Hybrid Network with IEEE 1394 and ATM", 1999, IEEE, pp. 148-149.*

(Continued)

*Primary Examiner*—Paul R. Myers
(74) *Attorney, Agent, or Firm*—Haverstock & Owens LLP

(57) ABSTRACT

The method and apparatus for cancelling a pending notify command of the present invention includes a mechanism which allows a controlling device to cancel a pending notify command. A controlling device has the ability to cancel a pending notify command, by sending a cancelling command to a target device while the notify command is pending. Preferably, the cancelling command is a status command. Alternatively, the cancelling command is a duplicate notify command. In a still further alternative embodiment, the cancelling command is a notify cancel command. A target device which receives a notify command from a controlling device, first sends an interim response to the controlling device. When the state of the target device changes, the target device then sends a notify response to the controlling device. Before the state of the target device changes, while the notify command is pending, if the target device receives the cancelling command, the target device then cancels the pending notify command.

30 Claims, 9 Drawing Sheets

U.S. PATENT DOCUMENTS

| | | | | |
|---|---|---|---|---|
| 5,574,867 | A | 11/1996 | Khaira | 395/293 |
| 5,579,496 | A | 11/1996 | Van Steenbrugge | 395/567 |
| 5,632,016 | A | 5/1997 | Hoch et al. | 395/200.02 |
| 5,650,775 | A | 7/1997 | Van Steenbrugge | 340/825.24 |
| 5,659,373 | A | 8/1997 | Hoekstra | 348/734 |
| 5,682,489 | A | 10/1997 | Harrow et al. | 395/349 |
| 5,694,555 | A | 12/1997 | Morriss et al. | 395/280 |
| 5,719,942 | A | 2/1998 | Aldred et al. | 380/49 |
| 5,724,646 | A | 3/1998 | Ganek et al. | 455/4.2 |
| 5,781,703 | A | 7/1998 | Desai et al. | 395/54 |
| 5,793,366 | A | 8/1998 | Mano et al. | 345/329 |
| 5,815,678 | A | 9/1998 | Hoffman et al. | 395/309 |
| 5,933,430 | A | 8/1999 | Osakabe et al. | 370/395 |
| 5,991,520 | A | 11/1999 | Smyers et al. | 395/280 |
| 6,055,641 | A | 4/2000 | Konaka et al. | 713/320 |
| 6,088,364 | A | 7/2000 | Tokuhiro | 370/466 |
| 6,094,681 | A | 7/2000 | Shaffer et al. | 709/224 |
| 6,141,702 | A | 10/2000 | Ludtke et al. | 710/5 |
| 6,150,953 | A * | 11/2000 | Tanaka et al. | 340/825.37 |
| 6,160,796 | A | 12/2000 | Zou | 370/257 |
| 6,169,725 | B1 | 1/2001 | Gibbs et al. | 370/216 |
| 6,233,611 | B1 | 5/2001 | Ludtke et al. | 709/223 |
| 6,237,049 | B1 | 5/2001 | Ludtke | 710/8 |
| 6,288,716 | B1 | 9/2001 | Humpleman et al. | 345/329 |
| 6,292,624 | B1 | 9/2001 | Saib et al. | 386/83 |
| 6,359,557 | B1 | 3/2002 | Bilder | 340/531 |
| 6,363,434 | B1 | 3/2002 | Eytchison | 709/313 |
| 6,370,688 | B1 | 4/2002 | Hejna, Jr. | 725/101 |
| 6,401,119 | B1 | 6/2002 | Fuss et al. | 709/224 |
| 6,438,110 | B1 | 8/2002 | Rai et al. | 370/254 |
| 6,466,971 | B1 | 10/2002 | Humpleman et al. | 709/220 |
| 6,513,064 | B1 | 1/2003 | Horiguchi et al. | 709/223 |
| 6,516,416 | B1 | 2/2003 | Gregg et al. | 713/201 |
| 6,564,295 | B1 | 5/2003 | Okabayashi et al. | 711/114 |
| 6,584,502 | B1 | 6/2003 | Natarajan et al. | 709/224 |
| 6,654,821 | B1 * | 11/2003 | Aikawa et al. | 710/36 |
| 2001/0021194 | A1 * | 9/2001 | Horiguchi et al. | 370/421 |

FOREIGN PATENT DOCUMENTS

| | | |
|---|---|---|
| EP | 0 631 247 A2 | 6/1994 |
| EP | 0 789 502 A2 | 9/1997 |
| EP | 0812092 A2 * | 12/1997 |
| JP | 409326812 A * | 12/1997 |

OTHER PUBLICATIONS

Tatsuya Igarashi et al. "Home Network File System for Home Network Based on IEEE-1394 Technology", 1999, IEEE, pp. 1000-1003.*

"*The IEEE-1394 High Speed Serial Bus*" by R.H.J. Bloks, 1996, pp. 209-216.

"*A Bus on a Diet-The Serial Bus Alternative, An Introduction to the P1394 High Performance Serial Bus*", Michael Teener, Apple Computer Inc., Santa Clara, CA., Published, Feb. 24, 1992, pp. 316-321.

"*P1394 Standard for a High Performance Serial Bus*", Copyright 1995, by The Institute of Electrical and Electronic Engineers, Inc., pp. 1-384.

"*AV/C Digital Interface Command Set General Specification*", by 1394 Trade Association, Version 3.0, Apr. 15, 1998, pp. 1-91.

* cited by examiner

METHOD OF AND APPARATUS FOR CANCELLING A PENDING AV/C NOTIFY COMMAND

FIELD OF THE INVENTION

The present invention relates to the field of sending and receiving commands between devices coupled together within a network. More particularly, the present invention relates to the field of sending and receiving AV/C command frames for inquiring about status and change of state of target devices.

BACKGROUND OF THE INVENTION

The IEEE standard, "IEEE 1394-2000 Standard For A High Performance Serial Bus," Draft ratified in 2000, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-2000 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-2000 standard provides a high-speed serial bus for interconnecting digital devices thereby providing a universal I/O connection. The IEEE 1394-2000 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-2000 standard is very thin in size compared to other bulkier cables used to connect such devices. Devices can be added and removed from an IEEE 1394-2000 bus while the bus is active. If a device is so added or removed the bus will then automatically reconfigure itself for transmitting data between the then existing nodes. A node is considered a logical entity with a unique address on the bus structure. Each node provides a configuration ROM, a standardized set of control registers and its own address space. Because of these advantages the IEEE 1394-2000 standard provides for a unique networking structure that is capable of incorporating audio/video devices, media play/record devices, computing devices and display devices.

The IEEE 1394-2000 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-2000 cable. The physical layer 16 also provides arbitration to ensure that all devices coupled to the IEEE 1394-2000 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The transaction layer 12 also provides a path for isochronous management data to be transferred to the serial bus management block 10 via read operations with isochronous control compare-swap registers. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A diverse range of products can be implemented with the ability to connect to an IEEE 1394-2000 serial bus network. These devices can have capabilities and functionality ranging from very simple to very complex. Specifically, a variety of audio/video devices, media play/record devices and computing/display devices are capable of being linked together over an IEEE 1394-2000 serial bus networking structure to support asynchronous and isochronous data transfers between the devices.

The IEEE 1394-2000 serial bus allows a collection of devices to work together in a high bandwidth, distributed environment to maximize the overall efficiency and functionality of the network. This allows manufacturers to remove expensive pieces of functionality from one device and locate that functionality in another device on the network, instead of duplicating this functionality in all devices on the network. While some of the devices have limited functionality and are relatively inexpensive, such devices require the support and interaction of other devices in order to bring the full functionality of the devices within the network to the user.

The AV/C Digital Interface Command Set is a command set used for data transactions between consumer audio/video equipment over an IEEE 1394-2000 serial bus. Neither the IEEE 1394-2000 serial bus nor the AV/C command set provide a master-slave relationship between the devices coupled within the IEEE 1394-2000 serial bus network. Instead, both the IEEE 1394-2000 serial bus and the AV/C command set operate based on a cooperative peer-to-peer coexistence of devices within the network. Discrete AV/C command and response data packets are transferred between networked devices over an IEEE 1394-2000 serial bus in an asynchronous data stream. The AV/C command and response data packets are typically formatted according to the AV/C protocol outlined in the AV/C Digital Interface Command Set. Transfers of AV/C command and response data packets over the IEEE 1394-2000 serial bus network are supported by an AV/C architecture. The AV/C architecture is used by devices to create, process and/or transmit AV/C command and response data packets.

The target device is controllable by a controller device that initiates desired data transactions. The desired data transactions are IEEE 1394-2000 write transactions, wherein a controller device requests a target device to perform a task.

The data transactions are contained within command and response frames of the command and request data packets which are formatted according to the Function Control Protocol (FCP) and then transferred asynchronously between device nodes on the IEEE 1394-2000 serial bus.

A format of a block write packet 30 according to the IEEE 1394-2000 standard is illustrated in FIG. 2. The asynchronous block write packet includes a header 31 and a data payload 32. The header 31 includes the fields destination_ID, tl, rt, tcode, pri, source_ID, destination_offset, data_length, extended_tcode and header_crc. The destination_ID field is a sixteen bit field which specifies the node ID of the receiving node to which the packet is addressed. The transaction label field tl is a six bit field that specifies a unique tag for each outstanding transaction from a node. The retry code field rt is a two bit field which specifies whether the packet is a retry attempt and the retry protocol to be followed by the destination node. The transaction code field tcode is a four bit field that specifies the packet format and the type of transaction that is to be performed. For a write request for data block operation the transaction code field value is equal to 0001.

The priority field pri is a four bit field that is used by the back plane. The source-ID field is a sixteen bit field that specifies the node ID of the transmitting node of the packet. The destination offset field is a forty-eight bit field that specifies the forty-eight bits of the destination node address of the request packet. The data length field is a sixteen bit field that specifies the length of the data field of data block payload packets. The extended transaction code field extended_tcode is a sixteen bit field that conventionally is only meaningful if the transaction code field indicates a lock request or lock response packet. The header_CRC field is a thirty-two bit field that is used to perform a cyclical redundancy check (CRC) on the data within the header.

The data portion of the packet includes a data block payload field and a data_crc field. The data_crc field is a thirty-two bit field that is used to perform a cyclical redundancy check (CRC) on the data within the data portion of the packet.

AV/C command and response data packets are transmitted between networked devices in data streams that are made up of one or more discrete data packets having the format illustrated in FIG. 2 and described above. The data packets are transmitted over the serial bus and received by a device with the appropriate destination address. Using a read transaction, data at a particular address within a responding node is transferred back to a requesting node. Using a write transaction, data is transferred from a requesting node to a particular address within one or more responding nodes. Using lock transactions, data is transferred from a requesting node to a responding node, processed with data at a particular address within the responding node and the result is then transferred back to the requesting node.

Again referring to FIG. 2, the data payload frame 33 is organized into a data sequence of data fields according to the Function Control Protocol (FCP) defined by the standard IEC 61883, Digital Interface For Consumer Audio/Video. The Function Control Protocol frame provides a simple format to encapsulate device command and response data sets within the IEEE 1394-2000 serial bus for asynchronous block read and write data transactions. The payload of the FCP frame 33 is limited to a maximum of 512 bytes.

FIGS. 3A and 3B show a detailed command FCP data frame 40 and a response FCP data frame 50 formatted in accordance with the standard AV/C protocol. The first data fields in both of the data frames 40 and 50 are the cts data fields 41 and 51, respectively. The cts data fields 41 and 51 hold 4 bits of data each and define the transaction format that is to be used in the FCP frames 40 and 50; the code for the standard AV/C format shown in FIGS. 3A and 3B is 0000. The ctype data field 42 and the response data field 52 are also 4 bits in length and encode the data packets 40 and 50 for the type of command or response data transaction. For example, a command frame such as the one shown in FIG. 3A, may be encoded for a control command, an inquiry command or any other data transaction that is required. The subunit type and the subunit ID data fields 43 and 53 encode the data packets 40 and 50 for the resource subunit within the device that is being used to execute the command data set. for example, the command packet may be issued to start a display of a video monitor, to turn on/off a tuner, turn on/off a recorder and the like. Since several subunit resources may belong to the same device or belong to the same device node address, the subunit type and ID is used to distinguish them. The opcode data fields 44 and 54 code the data packets 40 and 50 for the device operation to be executed and the operand data fields define the parameters of the operation to be executed.

As described above, the ctype data field 42 is 4 bits in length and encodes the command data packet 40 for the type of command data transaction included within the data packet 40. Table I below includes the different types of commands specified and the corresponding value for each command.

TABLE I

| AV/C Command Types | |
|---|---|
| VALUE | COMMAND TYPE |
| 0 | CONTROL |
| 1 | STATUS |
| 2 | SPECIFIC INQUIRY |
| 3 | NOTIFY |
| 4 | GENERAL INQUIRY |
| 5–7 | Reserved for future specification |
| 8–$F_{16}$ | Reserved for response codes |

As described above, the response data field 52 is 4 bits in length and encodes the response data packet 50 for the type of response data transaction included within the response packet 50. Table II below includes the different types of responses specified and the corresponding value for each response.

TABLE II

| AV/C Response Types | |
|---|---|
| VALUE | COMMAND TYPE |
| 0–7 | Reserved for command types |
| 8 | NOT IMPLEMENTED |
| 9 | ACCEPTED |
| $A_{16}$ | REJECTED |
| $B_{16}$ | IN TRANSITION |
| $C_{16}$ | IMPLEMENTED/STABLE |
| $D_{16}$ | CHANGED |
| $E_{16}$ | Reserved for future specification |
| $F_{16}$ | INTERIM |

As illustrated in Table I above, a value of 0000 within the ctype data field indicates a control command type. A control command is sent by a controller to a target device to instruct the target device to perform an operation. Either the AV unit or a subunit at the target device may be the recipient of the command, as determined by the subunit_type and subunit_ID fields in the command frame. The remaining fields, opcode and operand[n], specify the command. A target device that receives a control command shall return an AV/C response frame with one of the following four response codes: not implemented, accepted, rejected and interim. The not implemented response code is returned by the target device if the target device does not support the control command specified by the opcode and operand[n] field values, or if the command is addressed to a subunit not implemented by the target device. The accepted response code is returned if the target device implements the control command specified by the opcode and operand[n] values and the target state permits execution of the command. The rejected response code is returned if the target device implements the control command specified by the opcode and operand[n] values, but the target state does not permit execution of the command. The interim response code is returned if the target device implements the control command specified by the opcode and operand[n] values, but the target device is unable to respond with either an accepted or rejected response within 100 milliseconds. Unless a subsequent bus reset causes the AV/C transaction to be aborted, after sending an interim response the target device shall ultimately return a response frame with either an accepted or rejected response.

As illustrated in Table I, a value of 0001 within the ctype data field indicates a status command type. A status command is sent by a controller to a target device to instruct the target device to request the target device's current status. Status commands may be sent to either AV units or subunits. A target device that receives a status command shall return an AV/C response frame with one of the following four response codes: not implemented, rejected, in transition and stable. The not implemented response code is returned by the target device if the target device does not support the status command specified by the opcode and operand[n] field values, or the command is addressed to a subunit not implemented by the target device. The rejected response code is returned if the target device implements the status command specified by the opcode and operand[n] values, but the target state does not permit the return of status for the command. The in transition response code is returned by the target device if the target device implements the status command specified by the opcode and operand[n] values, but the target state is in transition, possibly because of an already acknowledged command or a manual operation. A subsequent status command, at an unspecified future time, may result in the return of a stable response code. The stable response code is returned by the target device if the target device implements the status command specified by the opcode and operand[n] values and the information requested is reported in the opcode and operand[n] values in the AV/C response frame.

As illustrated in Table I, a value of 0010 within the ctype data field indicates a specific inquiry command type. Inquiry commands may be used by a controller to determine whether or not a target device supports a particular control command. Except for the value within the ctype data field, the AV/C command frame for an inquiry command is identical to the corresponding control command. A controller may reliably use inquiry commands to probe the capabilities of a target device, since the target device shall not modify any state nor initiate any command execution in response to an inquiry command. A target device that receives an inquiry command shall return an AV/C response frame with only one of the following two response codes: implemented or not implemented. All other fields in the response frame are exact copies of the command frame. A response of implemented specifies that the corresponding control command specified by the opcode and operand[n] values is implemented by the target device. An AV device implementation may validate all of the operands or it may validate only the opcode and enough of the operands to uniquely identify the control command and determine its support level. A response of not implemented specifies that the corresponding control command specified by the opcode and operand[n] values is not implemented by the target device.

As illustrated in Table I, a value of 0011 within the ctype data field indicates a notify command type. A controller that desires to receive notification of future changes in a target device's state may use the notify command. Responses to a notify command shall indicate the current state of the target device and then, at some indeterminate time in the future, indicate the changed state of the target device. A target device that receives a notify command shall not modify its state but shall generate an immediate response frame with one of the following three response codes: not implemented, rejected and interim. The not implemented response code is returned by the target device if the target device does not support the control command specified by the opcode and operand[n] field values, or the command is addressed to a subunit not implemented by the target device. The rejected response code is returned if the target device implements the event notification for the condition specified by the opcode and operand[n] values, but the target device is not able to supply the requested information. The interim response code is returned if the target device supports the requested event notification and has accepted the notify command for any future change of state. The current state is indicated by the opcode and operand[n] values returned in the response frame. At some future time, the target device shall return an AV/C response frame with either a rejected or changed response code. Once a target device has accepted a notify command by the return of an interim response frame, the target device is primed to return a subsequent response frame upon the first change in the target device's state. The future change of the target device's state could be the result of an operation in progress when the notify command was received or it could be the result of a control command not yet received by the target device. A changed response code is sent if the target device supports the event notification specified by the opcode and operand[n] values and the target state differs from the target state at the time the interim response was returned. The altered target state is indicated by the opcode and operand[n] data returned in the response frame. This notification is a one-shot operation. If the controller wishes to be notified of additional changes in a target device, the controller must issue a notify command after each changed response.

As illustrated in Table I, a value of 0100 within the ctype data field indicates a general inquiry command type. General inquiry commands may be used by a controller to determine whether or not a target device supports a particular control command without being required to specify a particular set of parameters for that command. The format of the general inquiry command frame consists of only the opcode of the command which is being queried. As with the specific inquiry command, the target device shall not modify any state nor initiate any command execution in response to a general inquiry command. A target device that receives an inquiry command shall return an AV/C response frame with only one of the following two response codes: implemented or not implemented. The response frame shall also contain the opcode that was originally passed in. A response of implemented specifies that at least one of the corresponding control command variations specified by the opcode is implemented by the target device. A response of not implemented specifies that the corresponding control command specified by the opcode and operand[n] values is not implemented by the target device. Unlike other command types, general inquiry commands do not have a support level since they return information about the support level of the corresponding control command. However, the ability of an AV device to provide a response to a general inquiry command for any opcode is mandatory. This insures that the controller shall always receive a response to a support level inquiry command.

As illustrated in Table I, the values of 0101 through 0111 are reserved for future specification and the values of 1000 through 1111 are reserved for response codes.

An example of a data flow diagram showing the flow of data during an immediate AV/C transaction is illustrated in FIG. 4. The controlling or requesting node 80 and the target node 82 are illustrated in FIG. 4. A command frame is sent from the controlling node 80 to the target node 82 and written into the target node's FCP_Command register. The transaction is complete when the target node writes the AV/C response frame into the controlling node's FCP_Response register.

The AV/C command set allows 100 milliseconds for a responsive action to be sent before a transaction will time out. If the target or responding node 82 sends the response within the 100 millisecond time period, the transaction is an immediate transaction as illustrated in FIG. 4. Otherwise, if the target node 82 cannot complete the response within the 100 millisecond time period, an interim response is sent by the target node 82 and the transaction becomes a deferred transaction, as illustrated in FIG. 5. After some time interval, when the target node 82 has completed the response, the target node 82 then sends the final response frame to the controlling node 80.

The notify command is a deferred transaction command that is used by a controlling node 80 to obtain a notification of a change of state at the target node 82. For example, if a controlling node 80 wants to know when a VCR stops playing, the controlling node 80 will transmit a play notify command to the target (VCR) 82. As the target (VCR) 82 is playing, the target (VCR) 82 transmits an interim response to the controlling node 80 with the present state of the target (VCR) 82, specifying that the target (VCR) 82 is currently in the play mode. When the target (VCR) 82 finally stops playing, the target (VCR) 82 transmits a final response to the controlling node 82, notifying the controlling node 82 that the state of the target (VCR) 82 has changed to stop. During the time that the target (VCR) 82 issues the interim response and the time that the target (VCR) 82 issues the final response, the notify command is pending.

In some cases, a controlling node 80 might want to cancel a final notify response from a target node 82. For example, a controller may want to change course and perform other actions instead of waiting for a response from a notify command to return. Specifically, if a controlling node 80 wishes to perform inquiry commands on a device, it only wants to determine if a not implemented response is returned. If an interim response is returned, this typically satisfies the controlling node 80. At this point, the controlling node 80 does not care to wait for the final notify response. However, there is currently no way for a controlling node 80 to cancel a pending notify command.

SUMMARY OF THE INVENTION

The method and apparatus for cancelling a pending notify command of the present invention includes a mechanism which allows a controlling device to cancel a pending notify command. A controlling device has the ability to cancel a pending notify command, by sending a cancelling command to a target device while the notify command is pending. Preferably, the cancelling command is a status command. Alternatively, the cancelling command is a duplicate notify command. In a still further alternative embodiment, the cancelling command is a notify cancel command. A target device which receives a notify command from a controlling device, first sends an interim response to the controlling device. When the state of the target device changes, the target device then sends a notify response to the controlling device. Before the state of the target device changes, while the notify command is pending, if the target device receives the cancelling command, the target device then cancels the pending notify command.

In one aspect of the present invention, a method of cancelling a pending notify command at a target device comprises sending a cancelling command over a network from a controlling device to the target device and cancelling the pending notify command at the target device when the cancelling command is received while the pending notify command is pending. The cancelling command is preferably a status command sent while the pending notify command is pending. The cancelling command is alternatively a duplicate of the pending notify command sent while the pending notify command is pending. Alternatively, the cancelling command is a notify cancel command sent while the pending notify command is pending. The network preferably substantially complies with a version of the IEEE 1394 standard. The cancelling command preferably substantially complies with a version of the AV/C protocol.

In another aspect of the present invention, a target device for communicating with a controlling device over a network, the target device comprises means for communicating with the controlling device over the network, the means for communicating including ability to receive a notify command from the controlling device, issue an interim response to the notify command to the controlling device and receive a cancelling command from the controlling device and means for cancelling coupled to the means for communicating for cancelling a pending notify command if a cancelling command is received from the controlling device while the pending notify command is pending. The cancelling command is preferably a status command sent while the pending notify command is pending. The cancelling command is alternatively a duplicate of the pending notify command sent while the pending notify command is pending. Alternatively, the cancelling command is a notify cancel command sent while the pending notify command is pending. The network preferably substantially complies with a version of the IEEE 1394 standard. The cancelling command preferably substantially complies with a version of the AV/C protocol.

In yet another aspect of the present invention, a target device configured to communicate with a controlling device over a network, the target device comprises an interface circuit configured to communicate with the controlling device over the network, the interface circuit including ability to receive a notify command from the controlling device, issue an interim response to the notify command and receive a cancelling command from the controlling device and a control circuit coupled to the interface circuit to cancel a pending notify command if a cancelling command is received from the controlling device while the pending notify command is pending. The cancelling command is preferably a status command sent while the pending notify command is pending. The cancelling command is alternatively a duplicate of the pending notify command sent while the pending notify command is pending. Alternatively, the cancelling command is a notify cancel command sent while the pending notify command is pending. The network preferably substantially complies with a version of the IEEE 1394 standard. The cancelling command preferably substantially complies with a version of the AV/C protocol.

In still yet another aspect of the present invention, a notify cancel AV/C command data packet used to cancel a pending notify command at a target device, wherein the notify cancel AV/C command data packet is sent from a controlling device to a target device while the pending notify command is pending at the target device, and further wherein when a target device receives the notify cancel AV/C command data packet while the pending notify command is pending, the target device cancels the pending notify command.

In yet another aspect of the present invention, a network of devices coupled together comprises a controlling device configured to send a cancelling command to cancel a pending notify command and a target device including an interface circuit configured to communicate with the controlling device to receive the cancelling command from the controlling device and a control circuit coupled to the interface circuit to cancel a pending notify command if the cancelling command is received from the controlling device while the pending notify command is pending. The cancelling command is preferably a status command sent while the pending notify command is pending. The cancelling command is alternatively a duplicate of the pending notify command sent while the pending notify command is pending. Alternatively, the cancelling command is a notify cancel command sent while the pending notify command is pending. The target device is preferably coupled to the controlling device over a network substantially complying with a version of the IEEE 1394 standard. The cancelling command preferably substantially complies with a version of the AV/C protocol.

In yet a further aspect of the present invention, a network of devices coupled together by a standard IEEE 1394 serial bus comprises a controlling device in communication with the standard IEEE 1394 serial bus and configured for sending a cancelling command over the standard IEEE 1394 serial bus and a target device in communication with the standard IEEE 1394 serial bus and configured for receiving the cancelling command and cancelling a pending notify command if the cancelling command is received while the pending notify command is pending. The cancelling command is preferably a status command sent while the pending notify command is pending. The cancelling command is alternatively a duplicate of the pending notify command sent while the pending notify command is pending. Alternatively, the cancelling command is a notify cancel command sent while the pending notify command is pending.

Figure 1:
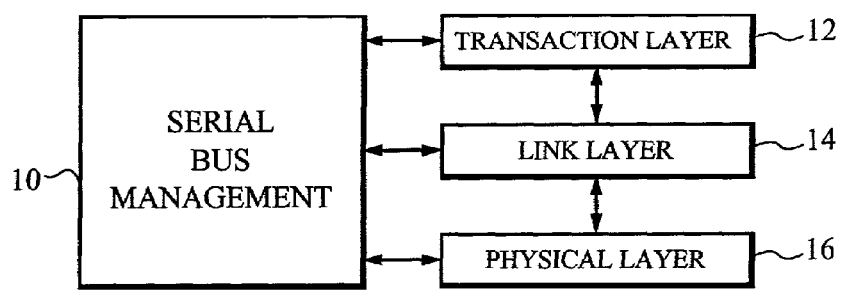
FIG. 1 illustrates a protocol of the IEEE 1394-2000 standard.
Figure 2:
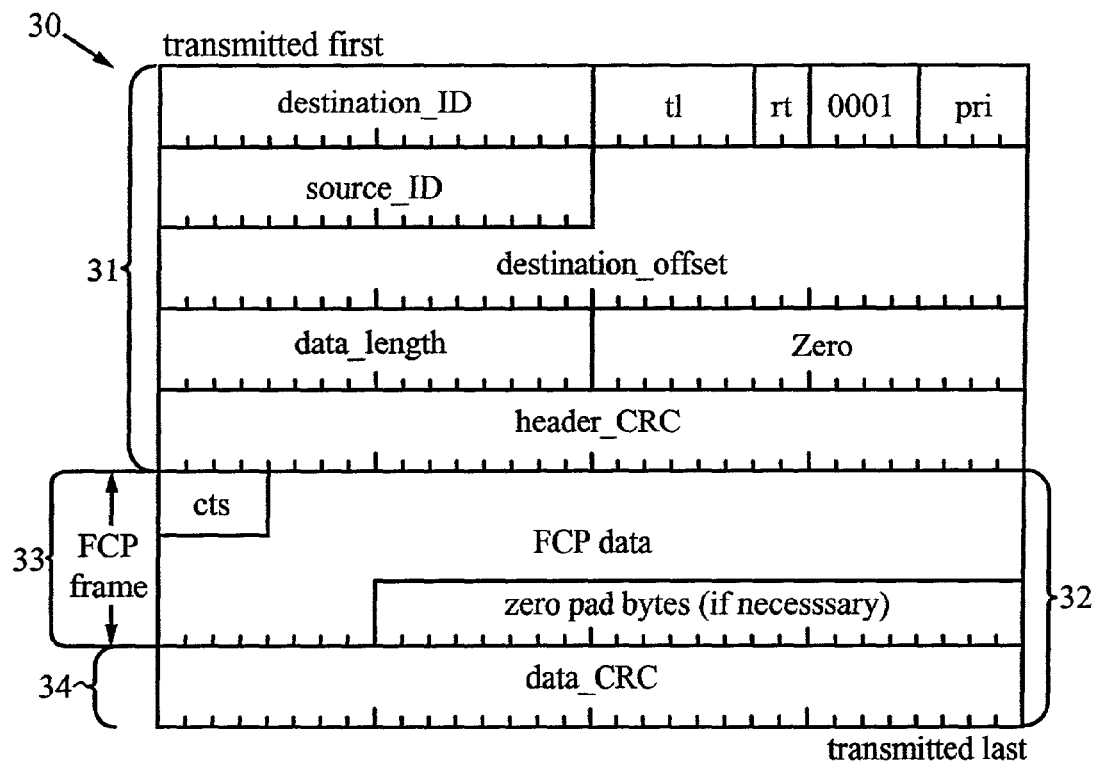
FIG. 2 illustrates a standard AV/C command and response data packet in accordance with the AV/C Digital Interface Command Set for asynchronous data packet transmission over an IEEE 1394-2000 serial bus network.
Figure 3A:
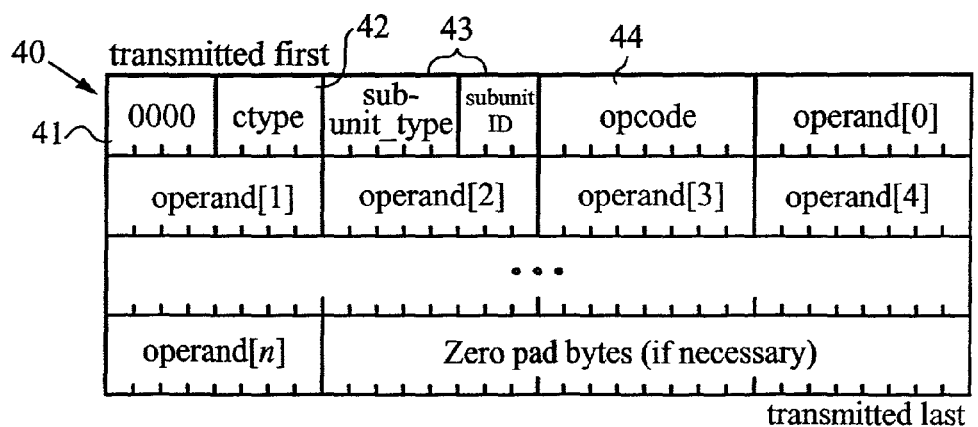
FIGS. 3A and 3B show command and response data frames, respectively, formatted according to the standard AV/C protocol.
Figure 3B:
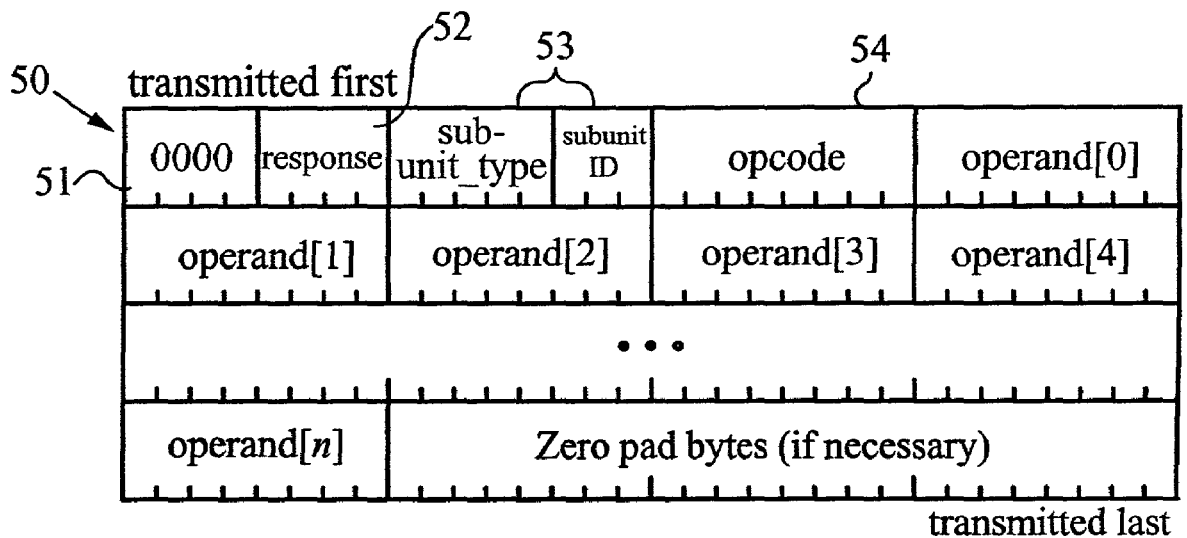
Figure 4:
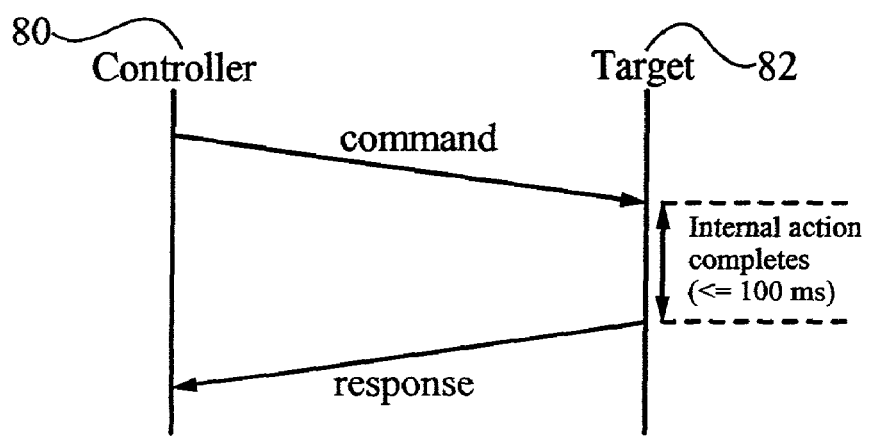
FIG. 4 illustrates a data flow diagram of an immediate AV/C transaction.
Figure 5:
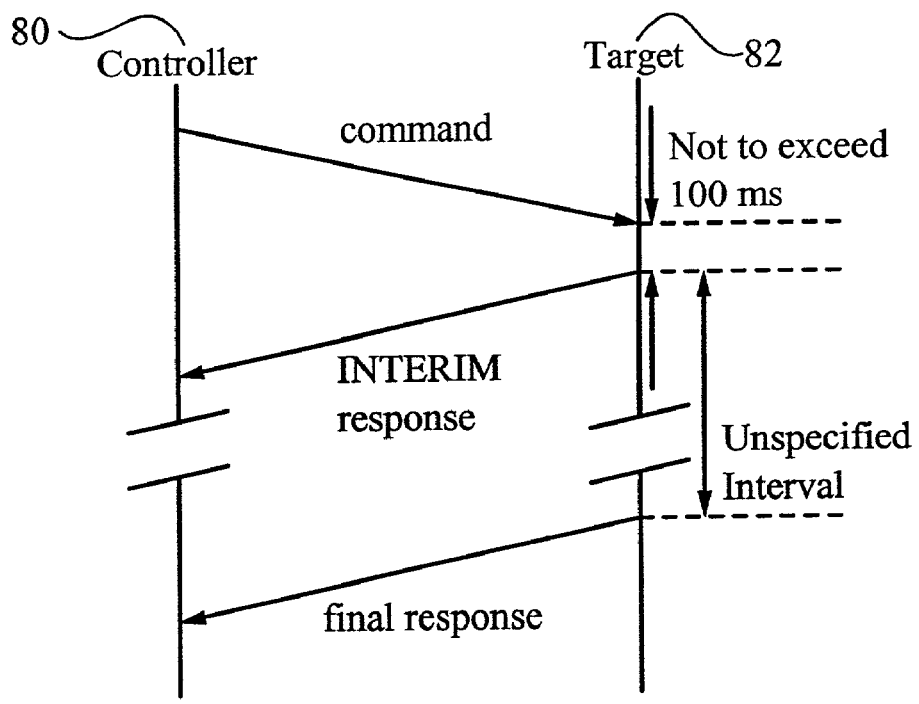
FIG. 5 illustrates a data flow diagram of a deferred AV/C transaction.
Figure 6:
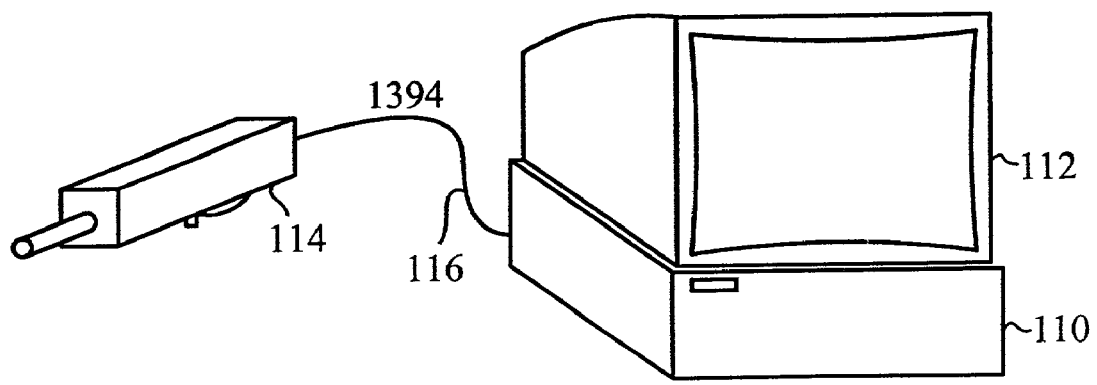
FIG. 6 illustrates an exemplary IEEE 1394-2000 serial bus network including a computer system and a video camera.

DETAILED DESCRIPTION OF THE PREFERRED EMBODIMENT:

A block diagram of an exemplary IEEE 1394-2000 serial bus network including a computer system and a video camera is illustrated in FIG. 6. The computer system 110 includes an associated display 112 and is coupled to the video camera 114 by the IEEE 1394-2000 serial bus cable 116. Video data and associated data are sent between the video camera 114 and the computer 110 over the IEEE 1394-2000 serial bus cable 116. As described herein, the video camera 114 and the computer 110 can be either the controlling device or the target device.

Figure 7:
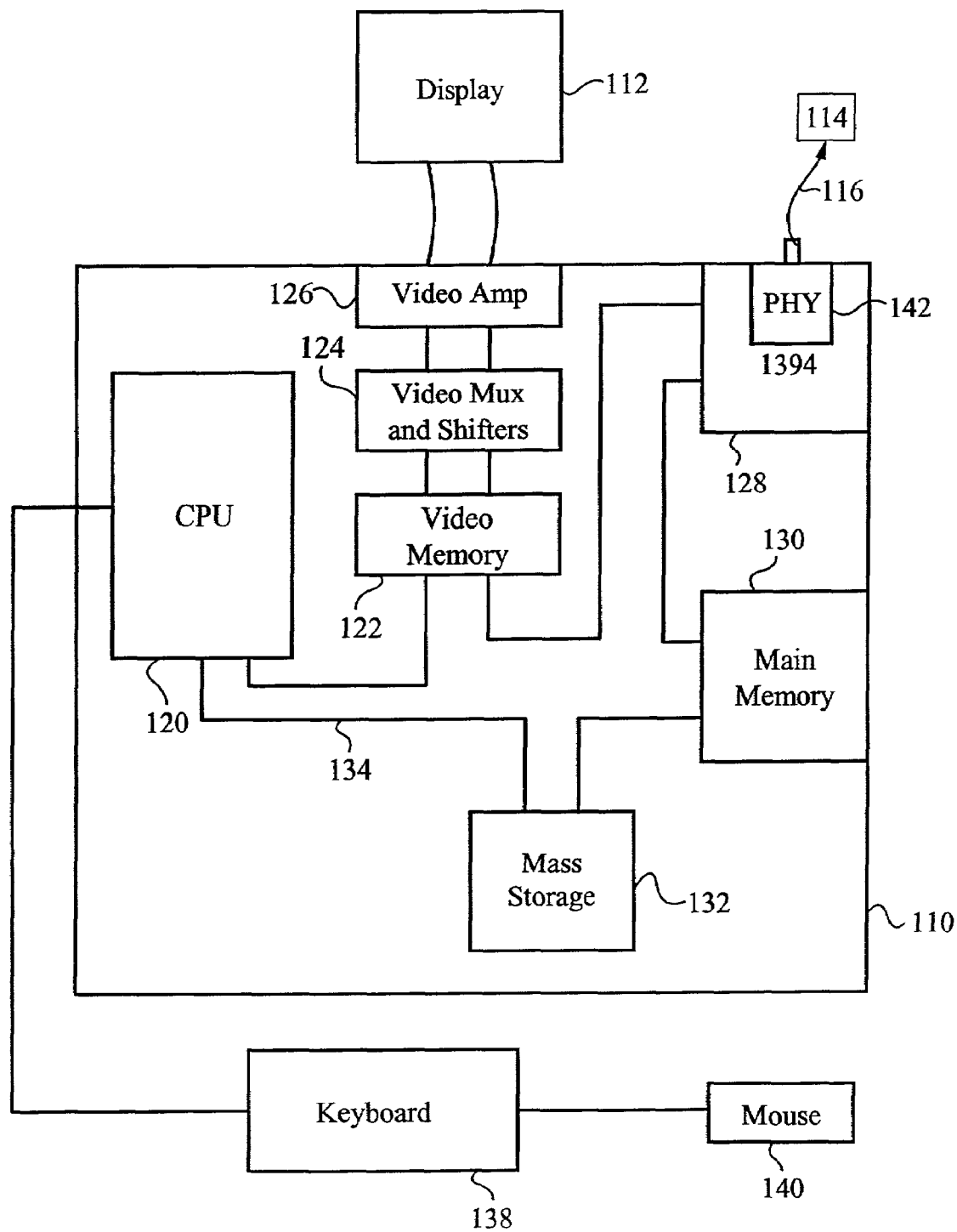
FIG. 7 illustrates a block diagram of the internal components of the computer system 110.

A block diagram of the internal components of the computer system 110 is illustrated in FIG. 7. The computer system 110 includes a central processor unit (CPU) 120, a main memory 130, a video memory 122, a mass storage device 132 and an IEEE 1394-2000 interface circuit 128, all coupled together by a conventional bidirectional system bus 134. The interface circuit 128 includes the physical interface circuit 142 for sending and receiving communications over the IEEE 1394-2000 serial bus. The physical interface circuit 142 is coupled to the camera 114 over the IEEE 1394-2000 serial bus cable 116. In the preferred embodiment of the present invention, the interface circuit 128 is implemented on an IEEE 1394-2000 interface card within the computer system 110. However, it should be apparent to those skilled in the art that the interface circuit 128 can be implemented within the computer system 110 in any other appropriate manner, including building the interface circuit onto the motherboard itself. The mass storage device 132 may include both fixed and removable media using any one or more of magnetic, optical or magneto-optical storage technology or any other available mass storage technology. The system bus 134 contains an address bus for addressing any portion of the memory 122 and 130. The system bus 134 also includes a data bus for transferring data between and among the CPU 120, the main memory 130, the video memory 122, the mass storage device 132 and the interface circuit 128.

The computer system 110 is also coupled to a number of peripheral input and output devices including the keyboard 138, the mouse 140 and the associated display 112. The keyboard 138 is coupled to the CPU 120 for allowing a user to input data and control commands into the computer system 110. A conventional mouse 140 is coupled to the keyboard 138 for manipulating graphic images on the display 112 as a cursor control device.

A port of the video memory 122 is coupled to a video multiplex and shifter circuit 124, which in turn is coupled to a video amplifier 126. The video amplifier 126 drives the display 112. The video multiplex and shifter circuitry 124 and the video amplifier 126 convert pixel data stored in the video memory 122 to raster signals suitable for use by the display 112.

The method and apparatus of the present invention includes a mechanism which allows a controlling device to cancel a pending notify command. Utilizing the method and apparatus of the present invention, a controlling device has the ability to cancel a pending notify command, by preferably sending a status command while the notify command is pending. Alternatively, a duplicate notify command is sent by a controlling device to a target device to cancel a notify command pending at the target device. In a still further alternative embodiment, a notify cancel command is sent by a controlling device to a target device to cancel a notify command pending at the target device.

A target device which receives a notify command from a controlling device, first sends an interim response to the controlling device. When the state of the target device changes, the target device then sends a notify response to the controlling device. In the preferred embodiment of the present invention, before the state of the target device changes, while the notify command is pending, if the target device receives a status command, the target device then cancels the pending notify command. Alternatively, while the notify command is pending, if the target device receives the same notify command again, the target device then cancels the pending notify command. In a still further alternative embodiment, while the notify command is pending, if the target device receives a notify cancel command, then the target device cancels the pending notify command.

Figure 8:
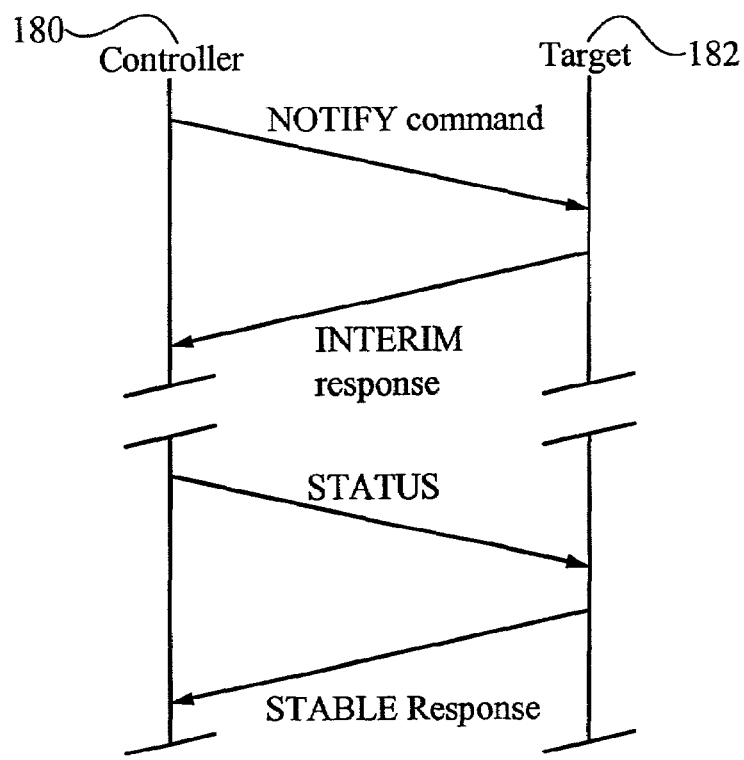
FIG. 8 illustrates a data flow diagram showing the flow of transactions for cancelling a pending notify command of the preferred embodiment of the present invention.

A data flow diagram showing the flow of transactions for cancelling a pending notify command of the preferred embodiment of the present invention is illustrated in FIG. 8. A notify command is first sent from the controlling device 180 to a target device 182. Because this is a deferred transaction, the target device 182 then sends an interim response to the controlling device 180. If at some time while the notify command is still pending, it is necessary for the controlling device 180 to cancel the pending notify command, the controlling device 180 then sends a status command to the target device 182. When the target device 182 receives a status command from the same controlling device 180 while a notify command is pending, the target device 182 preferably cancels the pending notify command and issues a stable response to the status command.

Figure 9:
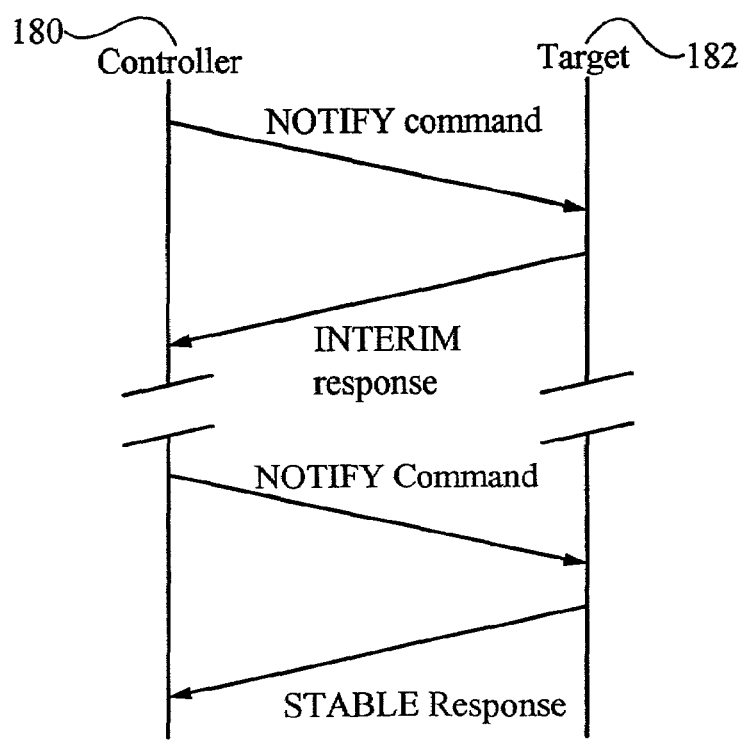
FIG. 9 illustrates a data flow diagram showing the flow of transactions for cancelling a pending notify command of an alternative embodiment of the present invention.

A data flow diagram showing the flow of transactions for cancelling a pending notify command of an alternative embodiment of the present invention is illustrated in FIG. 9. A notify command is first sent from the controlling device 180 to a target device 182. Because this is a deferred transaction, the target device 182 then sends an interim response to the controlling device 180. If at some time while the notify command is still pending, it is necessary for the controlling device 180 to cancel the pending notify command, the controlling device 180 then sends the same notify command again to the target device 182. When the target device 182 receives a notify command which is the same as a pending notify command, the target device then cancels the pending notify command and issues a stable response to the controlling device 180.

Figure 10:
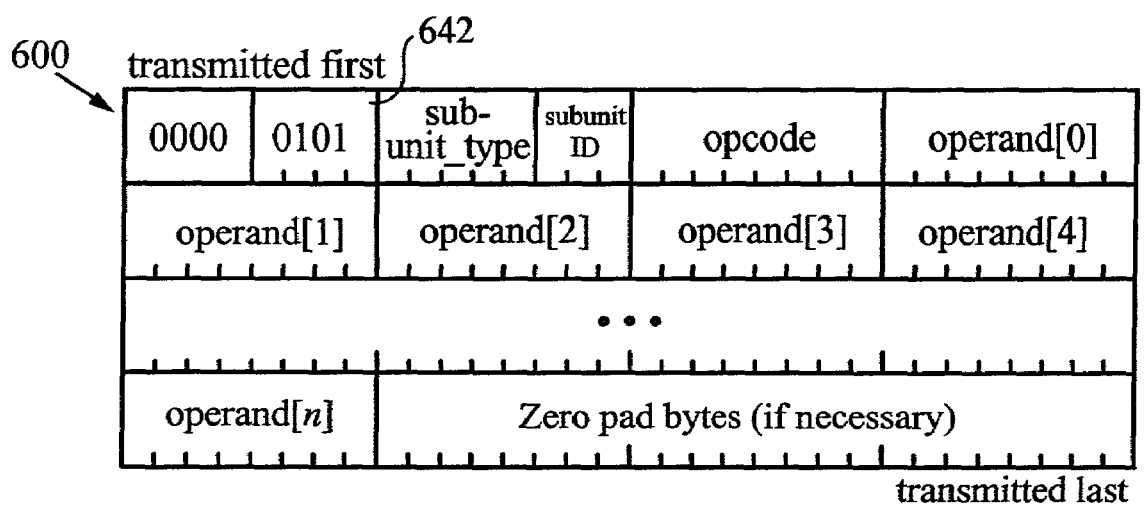
FIG. 10 illustrates a notify cancel command type FCP data frame according to an alternative embodiment of the present invention.

In a further alternative embodiment of the present invention, a new notify cancel command type is added. This mechanism is not preferred because a new AV/C command type is defined and therefore a reserved value of the ctype data field is used to signify the new notify cancel command type. The notify cancel command type of this alternative embodiment is sent by a controlling device 180 to a target device 182 to cancel a pending notify command. The notify cancel command type of this alternative embodiment of the present invention has a ctype data field value of 0101. Alternatively, the notify cancel command type can have any appropriate ctype data field value. A notify cancel command type FCP data frame, according to this alternative embodiment of the present invention, is illustrated in FIG. 10. The ctype data field 642 of the command FCP data frame 600 has a value of 0101 indicating that it is a notify cancel command type. This notify cancel command is sent by a controlling device 180 to a target device 182 to cancel a pending notify command. When a target device 182 receives a notify command from a controlling device 180, the target device 182 cancels the pending notify command.

Figure 11:
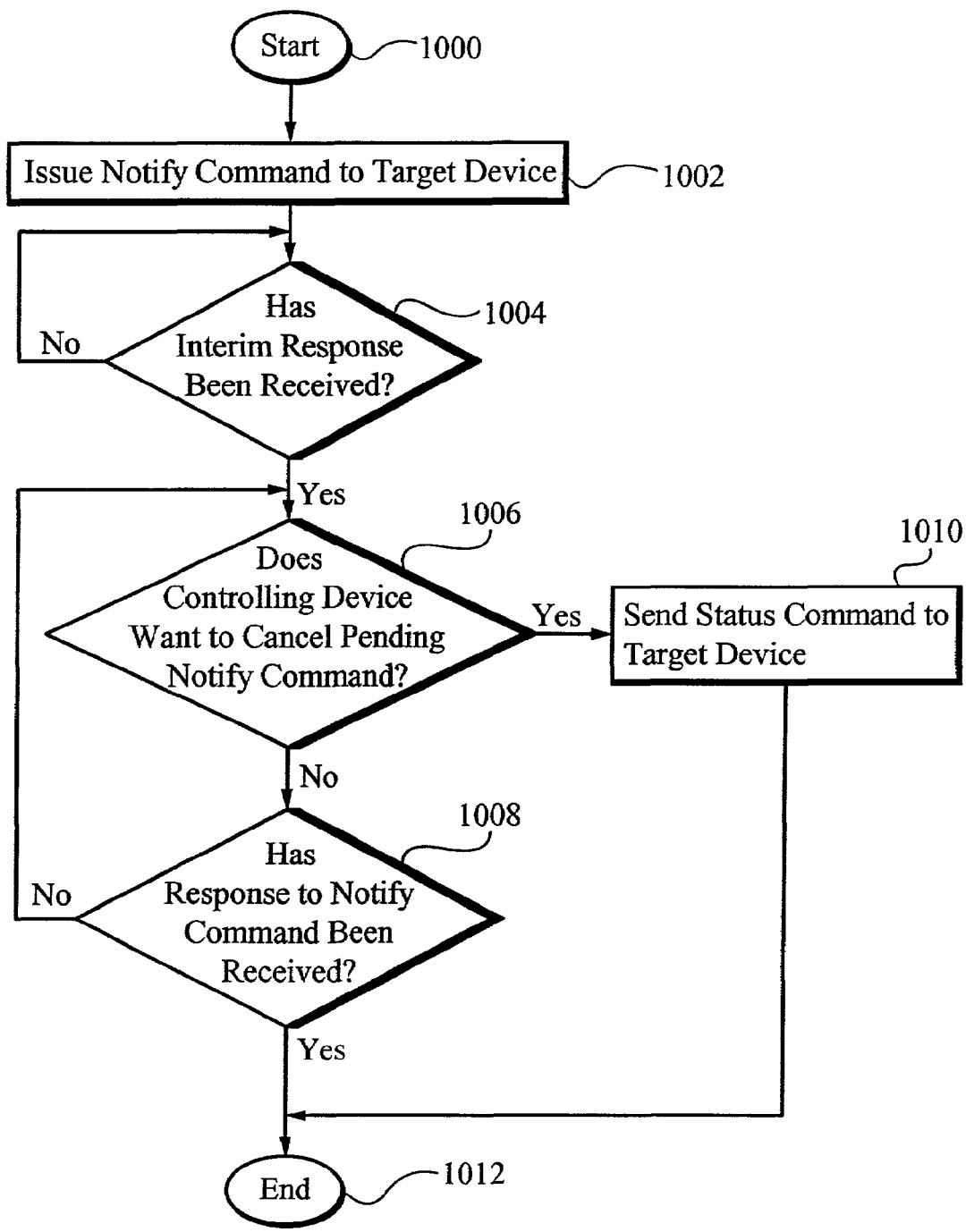
FIG. 11 illustrates a flowchart of the steps within the method of the preferred embodiment of the present invention implemented at a controlling device.

A flowchart illustrating the steps within the method of the preferred embodiment of the present invention, implemented at a controlling device, is illustrated in FIG. 11. The method of the present invention at the controlling device begins at the step 1000. At the step 1002, the controlling device issues a notify command to a target device. The controlling device then waits at the step 1004, until an interim response has been received. Once an interim response has been received, it is then determined at the step 1006, if the controlling device needs to cancel the pending notify command. If it is determined at the step 1006 that the controlling device does need to cancel the pending notify command, then a status command is sent to the target device at the step 1010. This status command sent while a notify command is pending at the target device, will cause the target device to cancel the pending notify command. The process then ends at the step 1012.

Otherwise, if it is determined at the step 1006 that the controlling device does not yet need to cancel the pending notify command, then it is determined at the step 1008 if a response to the pending notify command has been received. If it is determined at the step 1008 that a response to the pending notify command has been received, then the process ends at the step 1012. Otherwise, if it is determined at the step 1008 that a response to the pending notify command has not yet been received, then the process jumps back to the step 1006 to determine if the controlling device needs to cancel the pending notify command.

Figure 12:
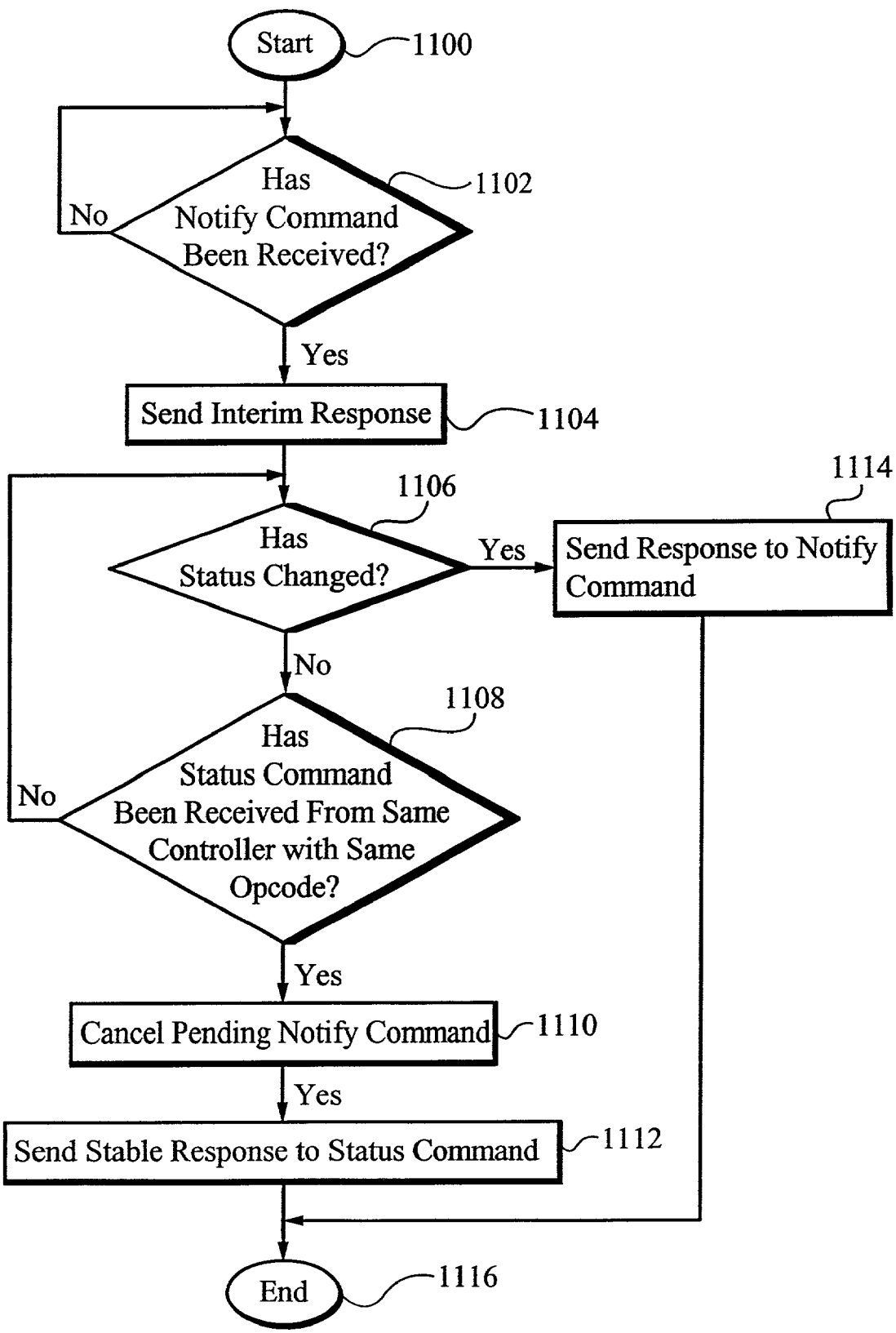
FIG. 12 illustrates a flowchart of the steps within the method of the preferred embodiment of the present invention implemented at a target device.

A flowchart illustrating the steps within the method of the preferred embodiment of the present invention, implemented at a target device, is illustrated in FIG. 12. The method of the present invention at the target device begins at the step 1100. The target device waits at the step 1102 until a notify command is received. Once a notify command is received, the target device then sends an interim response to the controlling device at the step 1104. At the step 1106, the target device determines if its status has changed. If it is determined at the step 1106 that the status of the target device has changed, then a response to the notify command is sent to the controlling device at the step 1114. The process then ends at the step 1116.

Otherwise, if it is determined at the step 1106, that the status of the target device has not changed, then it is determined at the step 1108 if a status command has been received from the same controlling device that the notify command was received from, with the same opcode. If it is determined at the step 1108 that a status command has been received from the same controlling device with the same opcode, the target device then cancels the pending notify command at the step 1110 and sends a stable response to the status command to the controlling device at the step 1112. The process then ends at the step 1116. Otherwise, if it is determined at the step 1108 that a status command has not been received, the process jumps back to the step 1106 to determine if the status of the target device has changed.

Therefore, as described above, using the mechanism of the present invention, a controlling device has the ability to cancel a pending notify command. Preferably, the status command cancels a pending notify command only if the same operand is used between the two commands and if the status command is issued by the same controlling device that issued the original notify command. The target device determines this by inspecting the node_ID field in the IEEE 1394 write packet and the subunit_type and subunit_ID fields in the AV/C frame within that same packet. Preferably, if these values in the status command match the values that were in the original pending notify command, the target device will then cancel the pending notify command. Also, preferably, a controlling device will not issue a status command to cancel a pending notify command, until the target device returns the interim response to the controlling device. This prevents any confusion between which response should be returned first, the response to the status command or the response to the notify command. If no notify command is pending when a target device receives a status command, the target device responds to the status command as is described in the current AV/C standard.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiment chosen for illustration without departing from the spirit and scope of the invention. Specifically, it will be apparent to one of ordinary skill that while the preferred embodiment of the present invention is used with an IEEE 1394-2000 serial bus structure, the present invention could also be implemented on any other appropriate digital interfaces or bus structures, including other or later versions of the IEEE 1394 serial bus.

I claim:

1. A method of cancelling a pending notify command at a target device comprising:
   a. sending a cancelling command over a network from a controlling device to the target device, wherein the cancelling command is a status command sent while the pending notify command is pending; and
   b. cancelling the pending notify command at the target device when the cancelling command is received while the pending notify command is pending.

2. The method as claimed in claim 1 wherein the network substantially complies with a version of the IEEE 1394 standard.

3. The method as claimed in claim 2 wherein the cancelling command substantially complies with a version of the AV/C protocol.

4. The method of claim 1 wherein the cancelling command is a status command sent after the controlling device determines cancellation is appropriate.

5. A target device for communicating with a controlling device over a network, the target device comprising:
   a. means for communicating with the controlling device over the network, the means for communicating including ability to receive a notify command from the controlling device, issue an interim response to the notify command to the controlling device and receive a cancelling command from the controlling device, wherein the cancelling command is a status command sent while the pending notify command is pending; and
   b. means for cancelling coupled to the means for communicating for cancelling a pending notify command if a cancelling command is received from the controlling device while the pending notify command is pending.

6. The target device as claimed in claim 5 wherein the network substantially complies with a version of the IEEE 1394 standard.

7. The target device as claimed in claim 6 wherein the cancelling command substantially complies with a version of the AV/C protocol.

8. A target device configured to communicate with a controlling device over a network, the target device comprising:
   a. an interface circuit configured to communicate with the controlling device over the network, the interface circuit including ability to receive a notify command from the controlling device, issue an interim response to the notify command and receive a cancelling command from the controlling device, wherein the cancelling command is a status command sent while the pending notify command is pending; and
   b. a control circuit coupled to the interface circuit to cancel a pending notify command if a cancelling command is received from the controlling device while the pending notify command is pending.

9. The target device as claimed in claim 8 wherein the network substantially complies with a version of the IEEE 1394 standard.

10. The target device as claimed in claim 9 wherein the cancelling command substantially complies with a version of the AV/C protocol.

11. A network of devices coupled together comprising:
    a. a controlling device configured to send a cancelling command to cancel a pending notify command, wherein the cancelling command is a status command sent while the pending notify command is pending; and
    b. a target device including:
       i. an interface circuit configured to communicate with the controlling device to receive the cancelling command from the controlling device; and
       ii. a control circuit coupled to the interface circuit to cancel a pending notify command if the cancelling command is received from the controlling device while the pending notify command is pending.

12. The network of devices as claimed in claim 11 wherein the target device is coupled to the controlling device over a network substantially complying with a version of the IEEE 1394 standard.

13. The network of devices as claimed in claim 11 wherein the cancelling command substantially complies with a version of the AV/C protocol.

14. A network of devices coupled together by a standard IEEE 1394 serial bus comprising:
   a. a controlling device in communication with the standard IEEE 1394 serial bus and configured for sending a cancelling command over the standard IEEE 1394 serial bus, wherein the cancelling command is a status command sent while the pending notify command is pending; and
   b. a target device in communication with the standard IEEE 1394 serial bus and configured for receiving the cancelling command and cancelling a pending notify command if the cancelling command is received while the pending notify command is pending.

15. A method of cancelling a pending notify command at a target device comprising:
   a. sending a cancelling command over a network from a controlling device to the target device, wherein the cancelling command is a duplicate of the pending notify command sent while the pending notify command is pending; and
   b. cancelling the pending notify command at the target device when the cancelling command is received while the pending notify command is pending.

16. The method as claimed in claim 15 wherein the network substantially complies with a version of the IEEE 1394 standard.

17. The method as claimed in claim 16 wherein the cancelling command substantially complies with a version of the AV/C protocol.

18. The device of claim 15 wherein the cancelling command is a duplicate of the pending notify command sent after the controlling device determines cancellation is appropriate.

19. A target device for communicating with a controlling device over a network, the target device comprising:
   a. means for communicating with the controlling device over the network, the means for communicating including ability to receive a notify command from the controlling device, issue an interim response to the notify command to the controlling device and receive a cancelling command from the controlling device, wherein the cancelling command is a duplicate of the pending notify command sent while the pending notify command is pending; and
   b. means for cancelling coupled to the means for communicating for cancelling a pending notify command if a cancelling command is received from the controlling device while the pending notify command is pending.

20. The target device as claimed in claim 19 wherein the network substantially complies with a version of the IEEE 1394 standard.

21. The target device as claimed in claim 20 wherein the cancelling command substantially complies with a version of the AV/C protocol.

22. A target device configured to communicate with a controlling device over a network, the target device comprising:
   a. an interface circuit configured to communicate with the controlling device over the network, the interface circuit including ability to receive a notify command from the controlling device, issue an interim response to the notify command and receive a cancelling command from the controlling device, wherein the cancelling command is a duplicate of the pending notify command sent while the pending notify command is pending; and
   b. a control circuit coupled to the interface circuit to cancel a pending notify command if a cancelling command is received from the controlling device while the pending notify command is pending.

23. The target device as claimed in claim 22 wherein the network substantially complies with a version of the IEEE 1394 standard.

24. The target device as claimed in claim 23 wherein the cancelling command substantially complies with a version of the AV/C protocol.

25. A network of devices coupled together comprising:
   a. a controlling device configured to send a cancelling command to cancel a pending notify command, wherein the cancelling command is a duplicate of the pending notify command sent while the pending notify command is pending; and
   b. a target device including:
      i. an interface circuit configured to communicate with the controlling device to receive the cancelling command from the controlling device; and
      ii. a control circuit coupled to the interface circuit to cancel a pending notify command if the cancelling command is received from the controlling device while the pending notify command is pending.

26. The network of devices as claimed in claim 25 wherein the target device is coupled to the controlling device over a network substantially complying with a version of the IEEE 1394 standard.

27. The network of devices as claimed in claim 25 wherein the cancelling command substantially complies with a version of the AV/C protocol.

28. A network of devices coupled together by a standard IEEE 1394 serial bus comprising:
   a. a controlling device in communication with the standard IEEE 1394 serial bus and configured for sending a cancelling command over the standard IEEE 1394 serial bus, wherein the cancelling command is a duplicate of the pending notify command sent while the pending notify command is pending; and
   b. a target device in communication with the standard IEEE 1394 serial bus and configured for receiving the cancelling command and cancelling a pending notify command if the cancelling command is received while the pending notify command is pending.

29. A method of communicating between a controlling device and a target device comprising:
   a. sending a notify command from the controlling device to the target device thereby establishing a pending notify command;
   b. sending the notify command a second time from the controlling device to the target device, while the pending notify command is pending, as a cancelling command; and
   c. cancelling the pending notify command at the target device when the notify command is received while the pending notify command is pending.

30. The method of claim 29 wherein the notify command is sent for a second time as a cancelling command after the controlling device determines cancellation is appropriate.

* * * * *